US012153740B2

(12) United States Patent
Justin et al.

(10) Patent No.: US 12,153,740 B2
(45) Date of Patent: Nov. 26, 2024

(54) CONFIGURABLE HOT KEYS FOR AN INPUT DEVICE OF AN INFORMATION HANDLING SYSTEM

(71) Applicant: Dell Products L.P., Round Rock, TX (US)

(72) Inventors: Wong Hin Loong Justin, Singapore (SG); Kai Leong Wong, Singapore (SG)

(73) Assignee: Dell Products L.P., Round Rock, TX (US)

(*) Notice: Subject to any disclaimer, the term of this patent is extended or adjusted under 35 U.S.C. 154(b) by 56 days.

(21) Appl. No.: 18/048,475

(22) Filed: Oct. 21, 2022

(65) Prior Publication Data

US 2024/0134465 A1   Apr. 25, 2024
US 2024/0231507 A9   Jul. 11, 2024

(51) Int. Cl.
*G06F 3/02* (2006.01)
*G06F 3/01* (2006.01)
*G06F 3/023* (2006.01)

(52) U.S. Cl.
CPC .............. *G06F 3/021* (2013.01); *G06F 3/016* (2013.01); *G06F 3/0238* (2013.01)

(58) Field of Classification Search
CPC ......... G06F 3/021; G06F 3/016; G06F 3/0238
See application file for complete search history.

(56) References Cited

U.S. PATENT DOCUMENTS

| 10,209,781 B2* | 2/2019 | Pate .................... G06F 3/03543 |
| 2011/0234495 A1* | 9/2011 | Chan .................... G06F 3/04886 345/163 |
| 2017/0147085 A1* | 5/2017 | Croisonnier ........ G06F 3/04883 |
| 2018/0217668 A1* | 8/2018 | Ligtenberg ........... H01H 13/785 |

FOREIGN PATENT DOCUMENTS

WO   WO-2015103245 A2 *   7/2015   ........... G06F 1/1662

* cited by examiner

*Primary Examiner* — Curtis A Kuntz
*Assistant Examiner* — James E Munion
(74) *Attorney, Agent, or Firm* — Norton Rose Fulbright US LLP (57) ABSTRACT

Aspects of this disclosure implement at least one sensor in a user input device with an identifiable user input on an information handling system. A method may include receiving, by an information handling system, an indication that at least one sensor, located on an outward facing surface of a frame housing a user input device, is actuated; comparing, by the information handling system, the indication to an active profile configuration; and identifying, by the information handling system, the indication as an input based on the active profile configuration. Other aspects are also disclosed.

19 Claims, 8 Drawing Sheets

| Profile Configuration | | | |
|---|---|---|---|
| Search | A | | CTRL+F |
| | B | | Backspace |
| | C | | Down Arrow |
| | D | | Delete |
| Gaming | A | | Up Arrow |
| | B | | Down Arrow |
| | C | | Left Arrow |
| | D | | Right Arrow |
| Math | A | | + |
| | B | | - |
| | C | | * |
| | D | | / |

CONFIGURABLE HOT KEYS FOR AN INPUT DEVICE OF AN INFORMATION HANDLING SYSTEM

FIELD OF THE DISCLOSURE

The instant disclosure relates to information handling systems. More specifically, portions of this disclosure relate to user input devices for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

When typing on a keyboard of the information handling system, most users conventionally use either one or both thumbs to actuate the spacebar, resulting in underutilization of the user's thumbs. Typists typically require wrist swing movement in order to actuate keys on a keyboard along the outer edges. Prolonged usage in this manner can increase the risk of carpal tunnel syndrome and cause strain on thumb joints.

Aspects of this disclosure implement at least one sensor in a user input device with an identifiable user input on an information handling system. In one embodiment, a row of configurable "hot keys" is implemented in front of the spacebar region of a keyboard for an information handling system. In certain embodiments of the disclosure, the hot keys may be actuated via proximity or touch sensing by the user's thumbs in front of the spacebar region with the projected direction of the sensors on a plane in front of the spacebar key cover facing the user. It may also have haptic features at these sensor locations which are implemented by means of Piezo solution. The functionality of each hot key or a combination thereof is configurable by the user.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

According to one embodiment, an apparatus may include a frame housing a first input device for receiving user input; and at least one sensor located on an outward facing surface of the frame.

In certain embodiments, the apparatus may further comprise piezoelectric actuators configured to provide haptic feedback.

In certain embodiments, the at least one sensor of the apparatus comprises at least one of: a proximity mutual-capacitance sensor comprising a pair of X-Y traces configured to provide a directive capacitance field; a touch mutual-capacitance sensor comprising a pair of X-Y traces configured to provide a directive capacitance field; a self-capacitance sensor comprising a sensor electrode configured to measure a capacitance between the electrode and a ground of a touch sensor circuit; or an infrared proximity sensor.

In some embodiments, the first user input device comprises a plurality of keys arranged in a plurality of rows on a first surface of the frame, wherein the at least one sensor is located on a second surface of the frame adjacent to the first surface. The at least one sensor may be located on the second surface approximately centered with regard to the first user input device on the first surface.

In certain embodiments, the apparatus comprises a controller coupled to the first input device and the at least one sensor, wherein the controller is configured to interface with an information handling system and transmit indications of user input received at the first input device and the at least one sensor.

According to another embodiment, a method may include receiving, by an information handling system, an indication that at least one sensor, located on an outward facing surface of a frame housing a user input device, is actuated; comparing, by the information handling system, the indication to an active profile configuration; and identifying, by the information handling system, the indication as an input based on the active profile configuration.

In some embodiments, a controller of the information handling system is configured to support a plurality of profile configurations, wherein each profile configuration maps input to the at least one sensor with an input to the first input device, and wherein the controller is configured to switch from a first profile to a second profile of the plurality of profiles when the controller detects a predefined user input to a combination of the first input device and the at least one sensor.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, audio controller, or similar electronic computing device that manipulates and transforms data represented as physical (electronic) quantities within the computer system's registers and memories into other data similarly represented as physical quantities within the computer system's registers, memories, or other such information storage, transmission, or display devices.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Aspects of the disclosure include apparatuses, configurations, and/or methods for implementing at least one sensor in a user input device with an identifiable user input on an information handling system. In one embodiment of the disclosure, a row of configurable hot keys is implemented in front of the spacebar region of a keyboard for an information handling system.

Figure 1A:
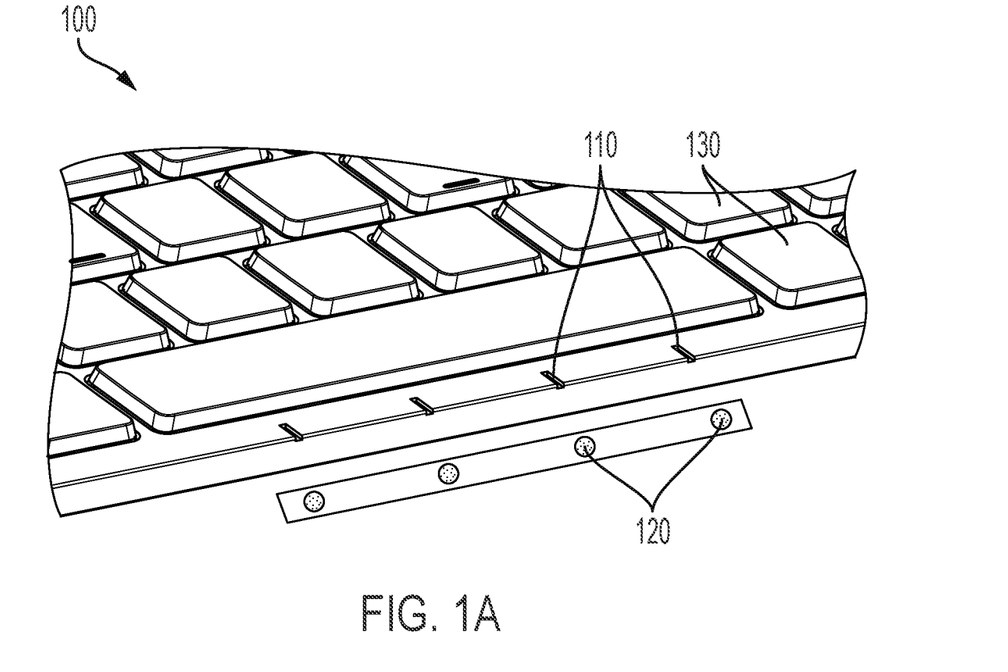
FIG. 1A is a conceptual diagram illustrating a user input device comprising at least one sensor according to some embodiments of the disclosure.
Figure 1B:
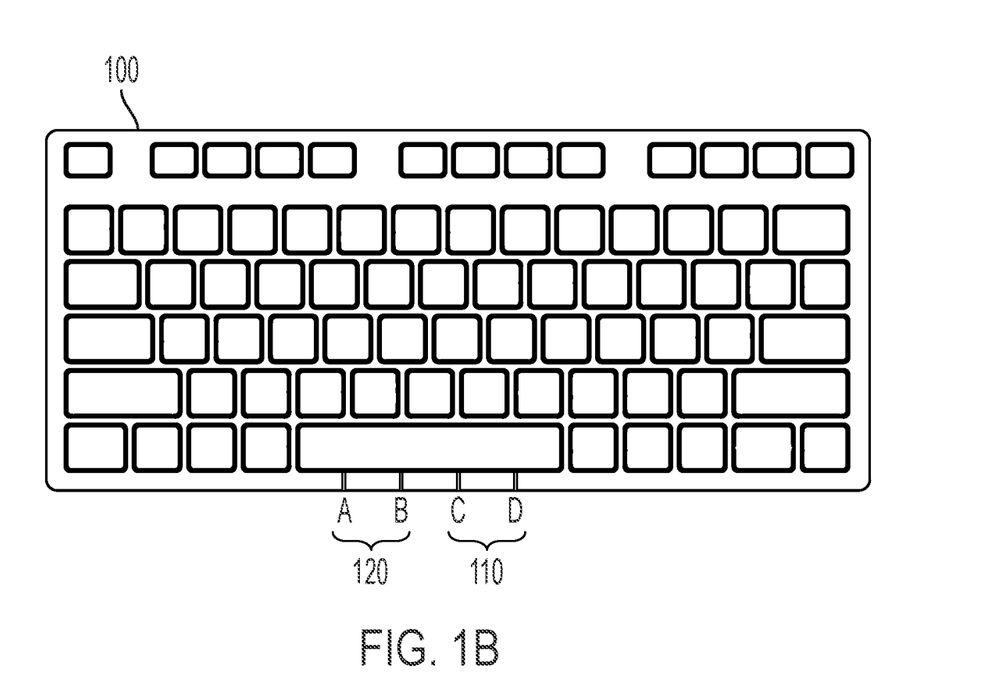
FIG. 1B is a conceptual diagram illustrating a user input device comprising at least one sensor according to some embodiments of the disclosure.

FIG. 1A and FIG. 1B illustrate a user input device, such as a computer keyboard according to certain embodiments of the disclosure, comprising at least one sensor for retrieving user input. Referring to FIG. 1A, the user input device 100 illustrates a computer keyboard, but could be any user input device connected to an information handling system. The frame housing a first user input device 130, such as a plurality of keys, may also include at least one sensor 120 for receiving user input. Additionally, the housing may further include a visual indicator 110 of the at least one sensor 120 to mark its location on the user input device 100.

Referring to FIG. 1B, the user input device 100 is a computer keyboard according to certain embodiments of the disclosure. Visual indicators 110 may represent the location of the at least one sensor located on an outward facing surface of the frame housing the user input device 100. Visual indicators 110 may be recessed into the housing frame, raised, silkscreen, color-coded, etc. Sensor identifiers 120 represent each of the at least one sensor of the user input device to assist the user in locating the sensors.

Figure 2A:
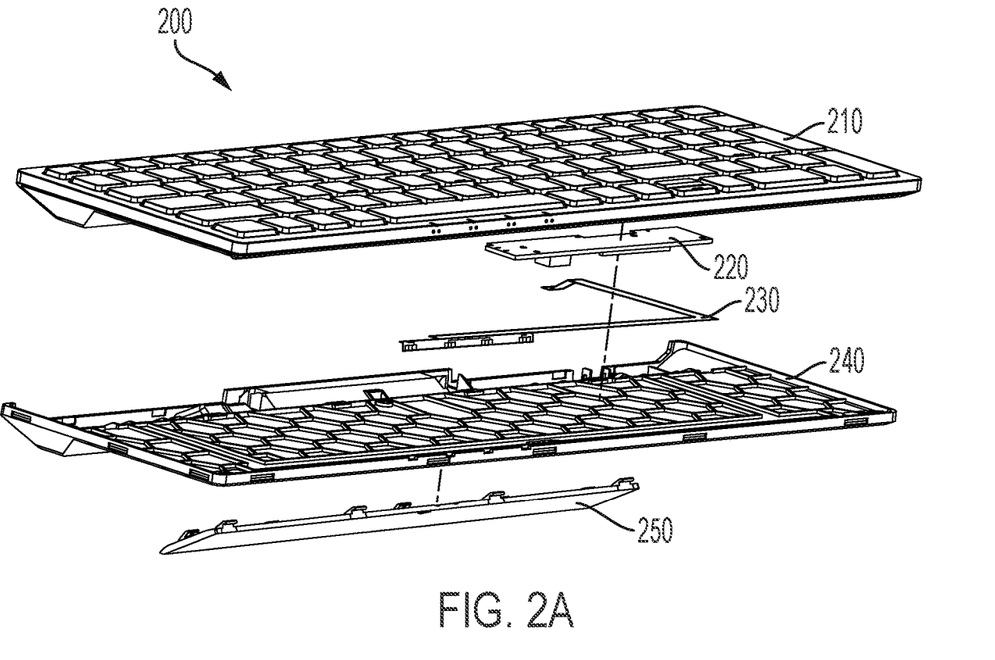
FIG. 2A is a conceptual diagram illustrating the assembly of a user input device comprising at least one sensor according to certain embodiments of the disclosure.
Figure 2B:
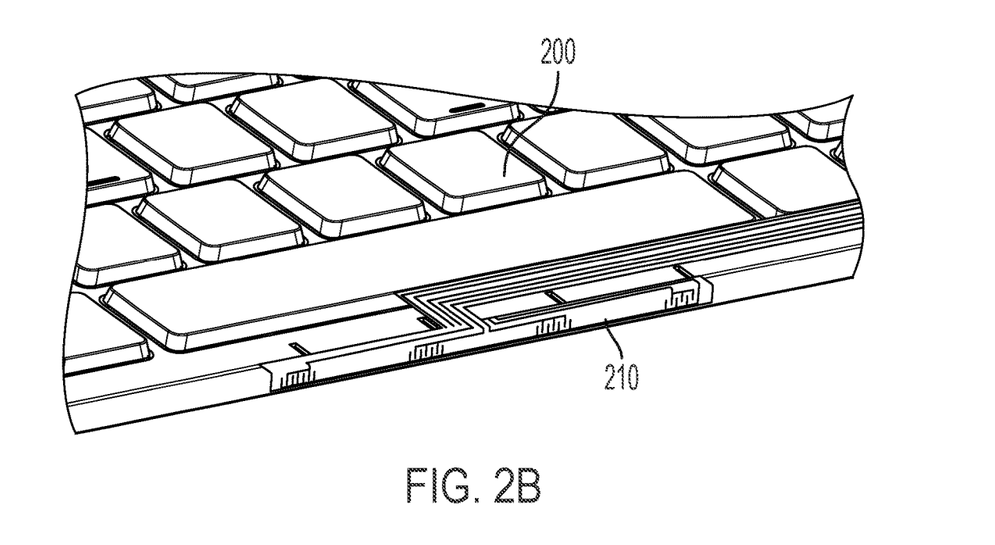
FIG. 2B is a is a conceptual diagram illustrating the positioning of at least one sensor in a user input device according to some embodiments of the disclosure.

FIG. 2A and FIG. 2B illustrate the assembly of an example user input device and the positioning of the at least one sensor according to certain embodiments of the disclosure. Referring to FIG. 2A, the user input device 200, such as a keyboard according to certain embodiments, can be assembled within a housing frame to comprise at least one sensor. The top cover subassembly 210 can be further disassembled into a top cover and key cap assembly. Between the top cover subassembly 210 and the bottom cover 240 may be a printed circuit assembly (PCA) 220 and a capacitive flexible printed circuit (FPC) 230. The battery cover 250 may be used in certain embodiments with a user input device powered separately from the information handling system, such as in wireless input devices. The PCA 220 may include a FPC connector and a capacitive controller chipset to function with the capacitive FPC 230, wherein the capacitive FPC 230 comprises the at least one sensor.

Referring to FIG. 2B, the user input device 200 is a computer keyboard according to certain embodiments of the disclosure. The capacitive FPC 230 comprises the at least one sensor and is housed within the user input device 200, with the at least one sensor located on an outward facing surface of the housing frame of the user input device 200. In the illustrated example, there may be four sensors 210A-210D configured to detect a presence of a user's digit in proximity with the respective one of the sensors 210A-210D. The location of the sensors 210A-D may be centered on the first input device, such as approximately centered with respect to the space bar, which is one configuration that allows the user to interact with the sensors 210A-D without making large wrist movements.

In the event that more than one sensor is actuated, and the multi-input is not identified as a recognized command, the user input device may send a first indication of the first sensor and a second indication of the second sensor. In one embodiment, there may be four sensors, labeled A, B, C, and D, respectively, configured to detect a presence of a user's digit. The location of the sensors may be centered on the first input device, such as approximately centered with respect to the space bar of a US QWERTY keyboard. One digit, such as the user's left thumb, may be responsible for actuating left-most sensors A and B. A second digit, such as the user's right thumb, may be responsible for actuating right-most sensors C and D. Multiple sensors may be actuated by the user to provide a certain user input. For example, if sensor A indicates input "3" and sensor D indicates input "5," and both sensors are actuated simultaneously, the resulting input on the information handling system may be "35" or "53," depending on which sensor indication was received first. In certain embodiments, the sensors are actuated by proximity, and, particularly the innermost sensors in a horizontal row, may be accidentally actuated due to the placement and reach of the user. In an example embodiment, if the user meaning to actuate sensor B accidentally also actuates sensor A, the information handling system may only receive an indication of sensor B being actuated, as the inner-most sensor. Similarly, if right-most sensors C and D are simultaneously activated, the information handling system may only receive an indication of sensor C being activated, as the inner-most sensor. However, it is possible for a user to actuate other combinations, such as A+C, B+D, B+C, and A+D.

In another example, when one sensor is actuated and held down, the information handling system receives a repeated indication of the actuation. Therefore, the user input results in repetitive output on the information handling system. When two or more sensors are actuated and held down, the information handling system would receive an indication from the first sensor, followed by an indication of the second sensor. The immediate actuation of more than one sensor is likely to not be perfectly simultaneous, resulting in an indication of first sensor being actuated followed by an indication of a second sensor being actuated.

Figure 3:
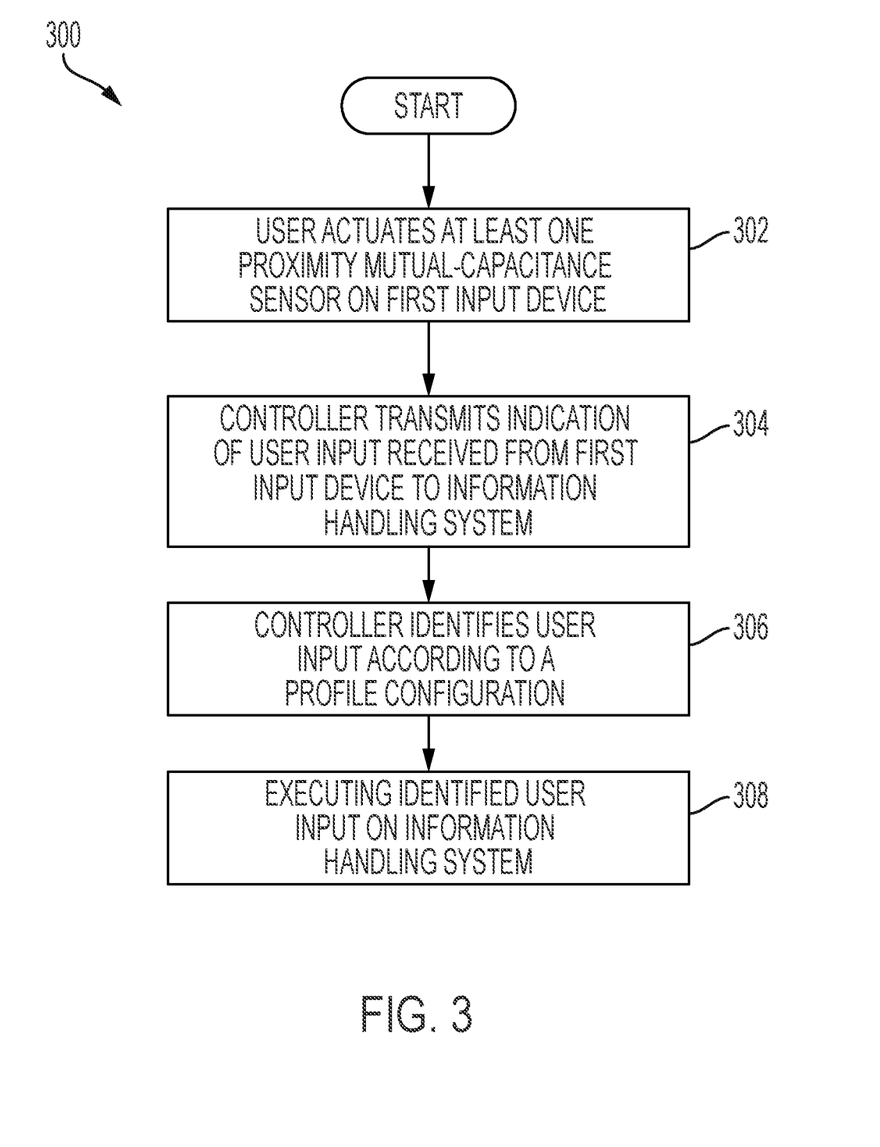
FIG. 3 is a flowchart illustrating a method of operating a user input device according to certain embodiments of the disclosure.

FIG. 3 is a flowchart illustrating a method 300 of operating a user input device according to certain embodiments of the disclosure. At block 302, the user actuates the at least one proximity mutual-capacitance sensor on the first input device. The proximity mutual-capacitance sensor enables directive detection of capacitive field changes in front of the outward facing surface of the housing frame where the at least one sensor is being projected. This directive capacitance field is disrupted by the user to actuate the sensor. For example, the at least one proximity mutual-capacitance sensor is located near the spacebar of a computer keyboard, with the at least one sensor facing outward directly toward the user. The user may actuate the proximity mutual-capacitance sensor through thumb movement in front of the at least one outward facing sensor. The at least one sensor will not be actuated by thumb movement or interaction with the top cover of the input device.

At block 304, the controller transmits an indication of the user input received from the user input device to the information handling system. If there is more than one sensor, each sensor will indicate a different user input to be executed on the information handling system according to a preset profile configuration. At block 306, the controller identifies the user input according to the active profile configuration. At block 308, the identified user input is executed on the information handling system.

Figure 4:
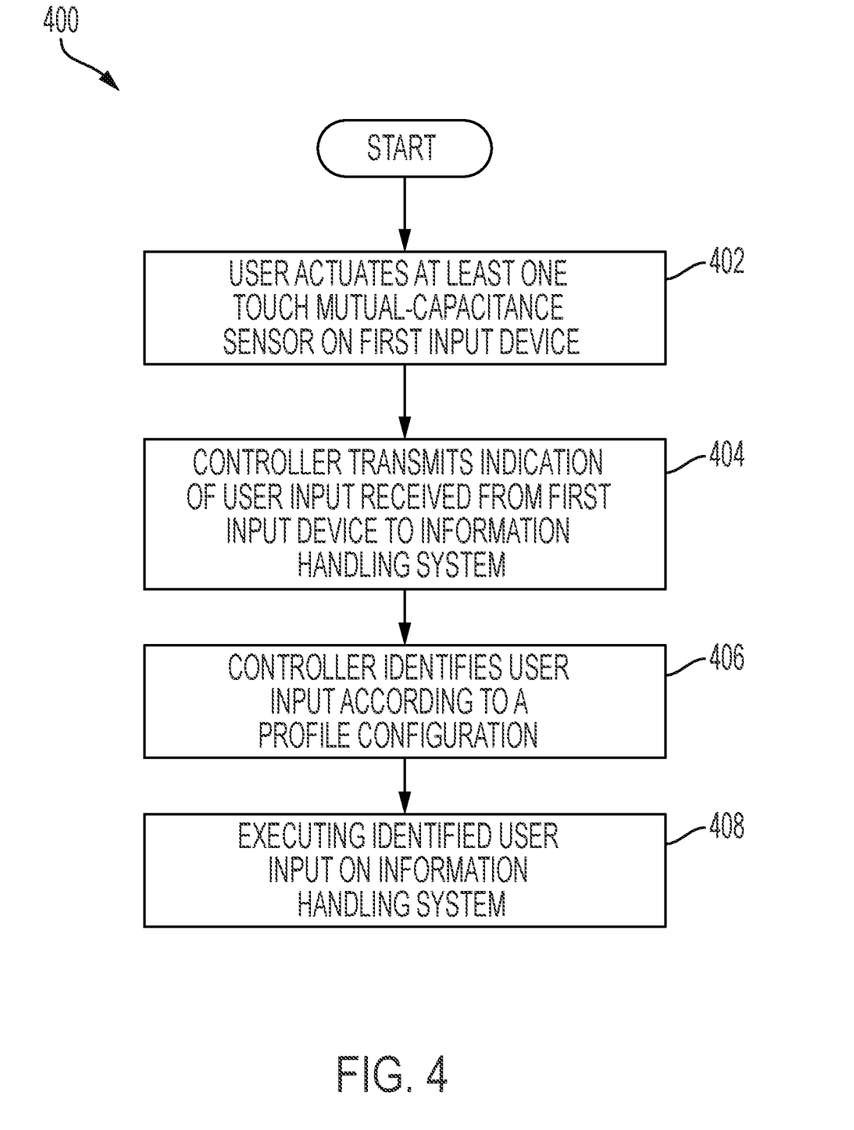
FIG. 4 is a flowchart illustrating a method of operating a user input device according to certain embodiments of the disclosure.

FIG. 4 is a flowchart illustrating a method 400 of operating a user input device according to certain embodiments of the disclosure. At block 402, the user actuates the at least one touch mutual-capacitance sensor on the first input device. The touch mutual-capacitance sensor enables directive detection of capacitive field changes in front of the outward facing surface of the housing frame where the at least one sensor is being projected. This directive capacitance field is disrupted by the user to actuate the sensor upon touch. For example, the at least one touch mutual-capacitance sensor is located near the spacebar of a computer keyboard, with the at least one sensor facing outward directly toward the user. The user may actuate the touch mutual-capacitance sensor through thumb contact with the least one outward facing sensor. In some embodiments, the user input device may further comprise piezoelectric actuators configured to provide haptic feedback in response to the user touching the at least one sensor. The at least one sensor is not actuated by thumb movement or interaction with the top cover of the input device.

At block 404, the controller transmits an indication of the user input received from the user input device to the information handling system. If there is more than one sensor, each sensor will indicate a different user input to be executed on the information handling system according to a preset profile configuration. At block 406, the controller identifies the user input according to the active profile configuration. At block 408, the identified user input is executed on the information handling system.

Figure 5:
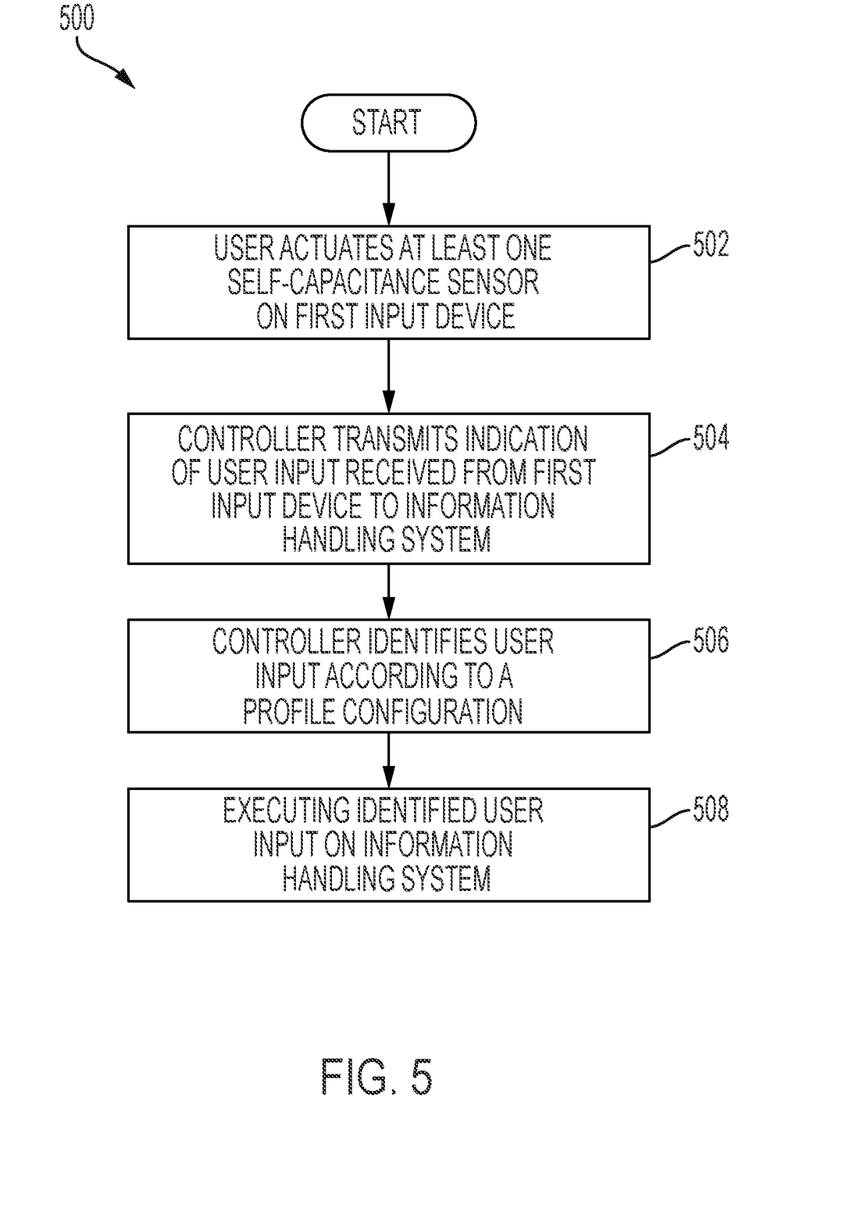
FIG. 5 is a flowchart illustrating a method of operating a user input device according to certain embodiments of the disclosure.

FIGURES is a flowchart illustrating a method 500 of operating a user input device according to certain embodiments of the disclosure. At block 502, the user actuates the at least one self-capacitance sensor on the first input device. The self-capacitance sensor comprises a sensor electrode configured to measure a capacitance between the electrode and a ground of a sensor circuit. The self-capacitance sensor may be actuated through proximity or touch, and detection is monitored by a capacitive sensing controller. The at least one sensor is not actuated by thumb movement or interaction with the top cover of the input device.

At block 504, the controller transmits an indication of the user input received from the user input device to the information handling system. If there is more than one sensor, each sensor will indicate a different user input to be executed on the information handling system according to a preset profile configuration. At block 506, the controller identifies the user input according to the active profile configuration. At block 508, the identified user input is executed on the information handling system.

Figure 6:
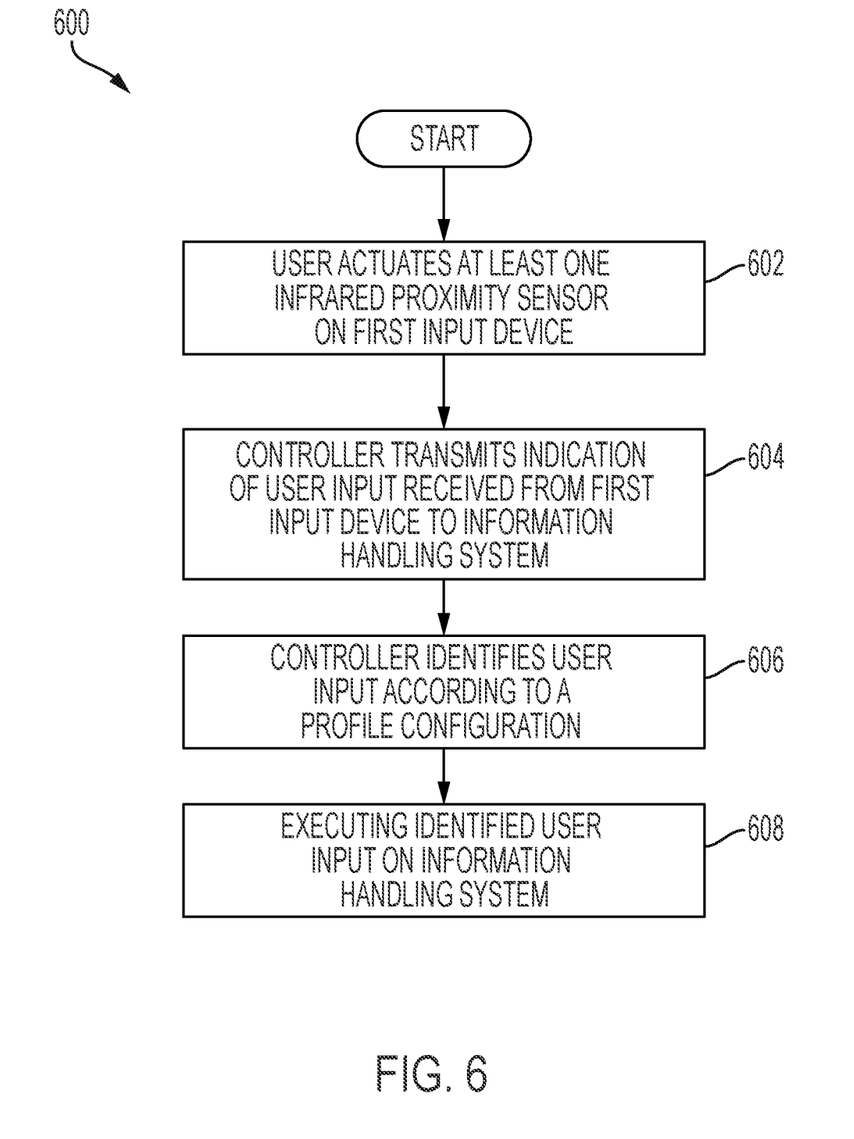
FIG. 6 is a flowchart illustrating a method of operating a user input device according to certain embodiments of the disclosure.

FIG. 6 is a flowchart illustrating a method 600 of operating a user input device according to certain embodiments of the disclosure. At block 602, the user actuates the at least one infrared proximity sensor on the first input device. The infrared proximity sensor may comprise light pipes facing outward of the input device toward the user. In certain embodiments, the transmitting and receiving lights are of the same light transmission frequency, and the transmitting light pipe is flush with the front surface of the top cover of the input device. The receiving sensor may be slightly recessed to reduce the angle of receptance of the transmitting light in some embodiments. For example, the at least one receiving sensor is located near the spacebar of a computer keyboard, with the at least one sensor facing outward directly toward the user. The user may actuate the infrared proximity sensor through thumb movement in front of the at least one outward facing sensor.

In some embodiments, the receiving sensor may also be flush with the front surface of the top cover of the input device. In an example in which there is more than one sensor, each transmitting light pipe may have a unique on-off-keying frequency modulated light signal. There is a receiving sensor for each of the on-off-keying modulated light transmissions. This results in high noise immunity towards ambient lighting or neighboring transmitter noise, such as other light signals. For example, the at least one receiving sensor is located near the spacebar of a computer keyboard, with the at least one sensor facing outward directly toward the user. The user may actuate the infrared proximity sensor through thumb movement in front of the at least one outward facing sensor.

At block 604, the controller transmits an indication of the user input received from the user input device to the information handling system. If there is more than one sensor, each sensor will indicate a different user input to be executed on the information handling system according to a preset profile configuration. At block 606, the controller identifies the user input according to the active profile configuration. At block 608, the identified user input is executed on the information handling system.

Figure 7:
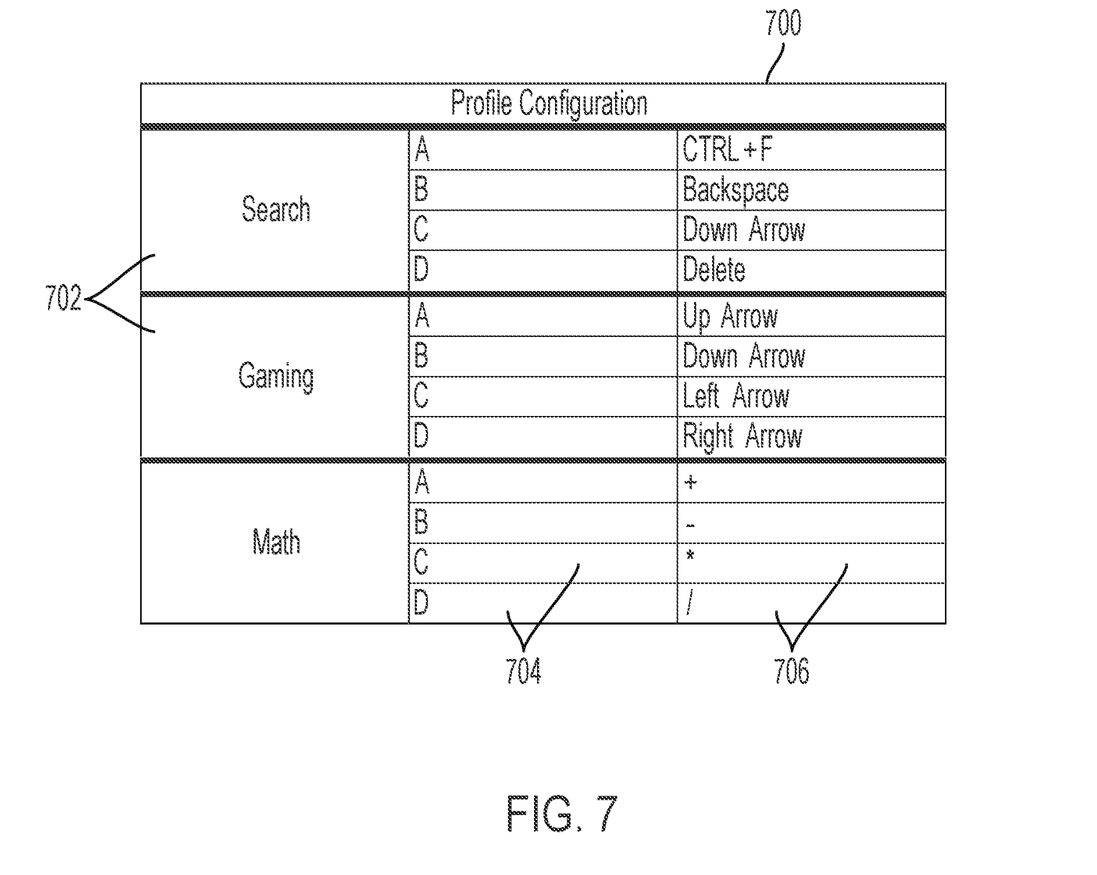
FIG. 7 is a table illustrating profile configurations for identifying a user input according to some embodiments of the disclosure.

FIG. 7 illustrates profile configurations for identifying a user input according to some embodiments of the disclosure. Referring to FIG. 7, the profile configuration table 700 displays the profiles 702 and sensor identifiers 704. In one embodiment, there may be four sensors, labeled A, B, C, and D, respectively. Each sensor corresponds to an input 706 to be executed on the information handling system. In one embodiment, the active profile configuration is "Math," for which the user may actuate any of the one or more sensors to execute the respective operation input 706 for that profile 702. Profiles 702 may be any desired keys or combination of keys for the user's convenience. The user may switch between profiles 702 while using the user input device by actuating a combination of sensors, or "hot keys," physical keys, such as on a computer keyboard, or any other variation of inputs from a user input device. The switching of profiles 702 may be done through software on the information handling system, or through a predetermined combination of hot key and physical key actuation. Switching of profiles may, for example, be indicated by the user by holding the spacebar, left extreme sensor, and right extreme sensor in an embodiment in which there are four respective sensors in front of the spacebar of a keyboard. The user may alternatively configure an "fn" key, for example, to enable this functionality of quickly switching between profile configurations in other embodiments.

The key mappings for the sensors may map the sensor input to keys that are along an outside of the keyboard or key combinations that involve at least one key along an outside of the keyboard. These keys would require a large wrist swing movement if actuating keys along the edges of the keyboard. Examples of such keys in certain keyboard layouts include delete, backspace, enter, tab, and navigation keys (Up/Down/Left/Right Arrow). In some embodiments, certain sensor configurations may identify the at least one sensor to actuate a combination of keys on a user input device. Examples may include adjusting screen brightness (fn+F5), muting volume (fn+F1), actuating Ctrl+Alt+Delete, etc.

The sensors facing the user while the user is interacting with the keyboard thus provide a row of configurable hot keys that may improve user speed when interacting with the keyboard and reduce risk of injury while interacting with the keyboard. The location of the sensors may be chosen to be at a position where the user's fingers idle during interaction with the keyboard. For example, most users utilize either thumb to actuate the spacebar when typing on a computer keyboard. As compared to other fingers, there is underutilization of both thumbs because both thumbs are conventionally used to actuate only one key function.

These example embodiments describe and illustrate various implementations of receiving user input from at least one sensor on an input device of an information handling system.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. One example configuration of an information handling system is described with reference to FIG. 8.

Figure 8:
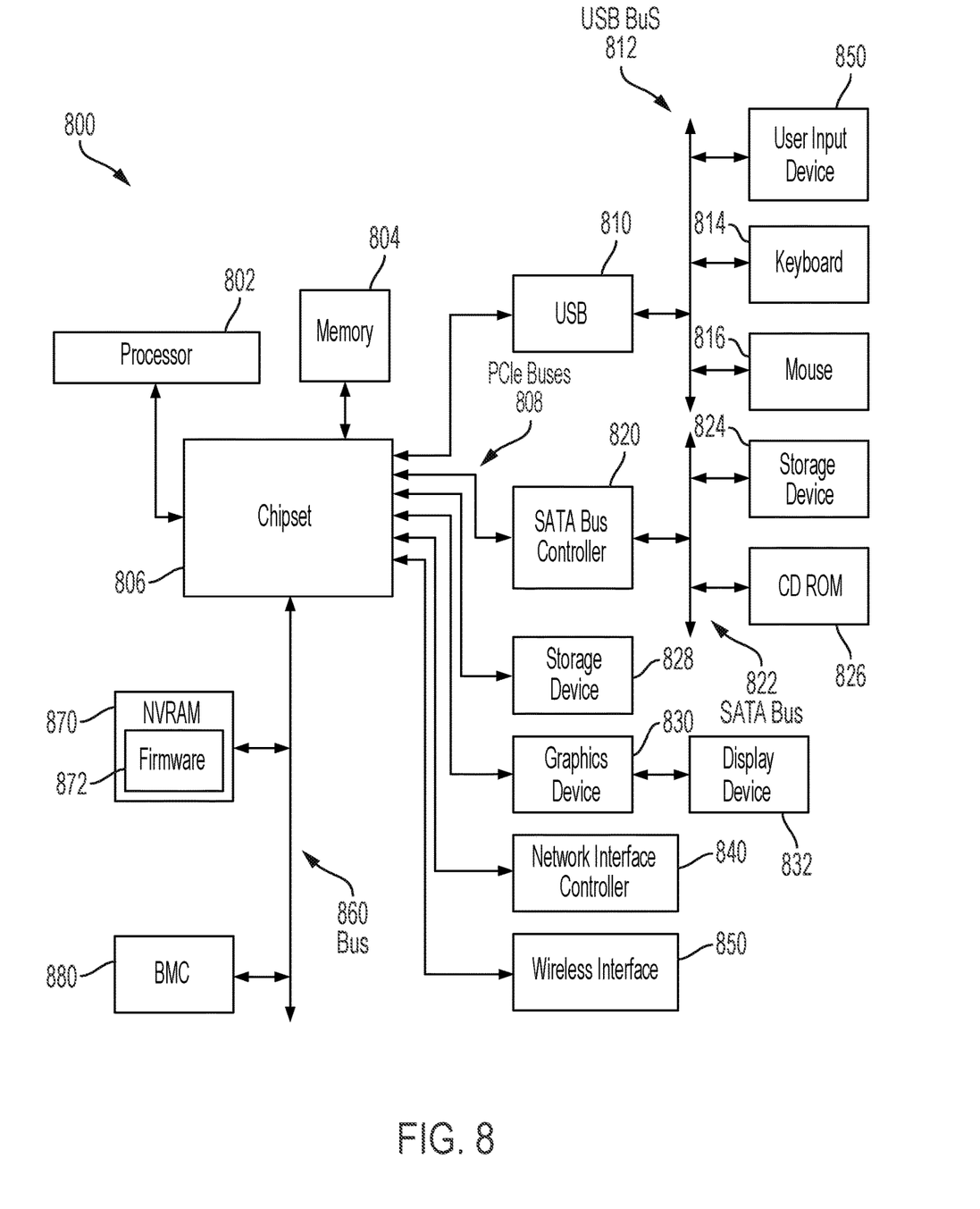
FIG. 8 is a schematic block diagram of an example information handling system according to some embodiments of the disclosure.

FIG. 8 illustrates an example information handling system 800. Information handling system 800 may include a processor 802 (e.g., a central processing unit (CPU)), a memory (e.g., a dynamic random-access memory (DRAM)) 804, and a chipset 806. In some embodiments, one or more of the processor 802, the memory 804, and the chipset 806 may be included on a motherboard (also referred to as a mainboard), which is a printed circuit board (PCB) with embedded conductors organized as transmission lines between the processor 802, the memory 804, the chipset 806, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 802, the memory 804, the chipset 806, and/or other components may be organized as a System on Chip (SoC).

The processor 802 may execute program code by accessing instructions loaded into memory 804 from a storage device, executing the instructions to operate on data also loaded into memory 804 from a storage device, and generate output data that is stored back into memory 804 or sent to another component. The processor 802 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 802 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 806 may facilitate the transfer of data between the processor 802, the memory 804, and other components. In some embodiments, chipset 806 may include two or more integrated circuits (ICs), such as a northbridge controller coupled to the processor 802, the memory 804, and a southbridge controller, with the southbridge controller coupled to the other components such as USB 810, SATA 820, and PCIe buses 808. The chipset 806 may couple to other components through one or more PCIe buses 808.

Some components may be coupled to one bus line of the PCIe buses 808, whereas some components may be coupled to more than one bus line of the PCIe buses 808. One example component is a universal serial bus (USB) controller 810, which interfaces the chipset 806 to a USB bus 812. A USB bus 812 may couple input/output components such as a keyboard 814 and a mouse 816, but also other components such as USB flash drives, or another information handling system. Another example component is a SATA bus controller 820, which couples the chipset 806 to a SATA bus 822. The SATA bus 822 may facilitate efficient transfer of data between the chipset 806 and components coupled to the chipset 806 and a storage device 824 (e.g., a hard disk drive (HDD) or solid-state disk drive (SDD)) and/or a compact disc read-only memory (CD-ROM) 826. The PCIe bus 808 may also couple the chipset 806 directly to a storage device 828 (e.g., a solid-state disk drive (SDD)). A further example of an example component is a graphics device 830 (e.g., a graphics processing unit (GPU)) for generating output to a display device 832, a network interface controller (NIC) 840, and/or a wireless interface 850 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 806 may also be coupled to a serial peripheral interface (SPI) and/or Inter-Integrated Circuit (I2C) bus 860, which couples the chipset 806 to system management components. For example, a non-volatile random-access memory (NVRAM) 870 for storing firmware 872 may be coupled to the bus 860. As another example, a controller, such as a baseboard management controller (BMC) 880, may be coupled to the chipset 806 through the bus 860. BMC 880 may be referred to as a service processor or embedded controller (EC). Capabilities and functions provided by BMC 880 may vary considerably based on the type of information handling system. For example, the term baseboard management system may be used to describe an embedded processor included at a server, while an embedded controller may be found in a consumer-level device. As disclosed herein, BMC 880 represents a processing device different from processor 802, which provides various management functions for information handling system 800. For example, an embedded controller may be responsible for power management, cooling management, and the like. An embedded controller included at a data storage system may be referred to as a storage enclosure processor or a chassis processor.

System 800 may include additional processors that are configured to provide localized or specific control functions, such as a battery management controller. Bus 860 can include one or more busses, including a Serial Peripheral Interface (SPI) bus, an Inter-Integrated Circuit (I2C) bus, a system management bus (SMBUS), a power management bus (PMBUS), or the like. BMC 880 may be configured to provide out-of-band access to devices at information handling system 800. Out-of-band access in the context of the bus 860 may refer to operations performed prior to execution of firmware 872 by processor 802 to initialize operation of system 800.

Firmware 872 may include instructions executable by processor 102 to initialize and test the hardware components of system 800. For example, the instructions may cause the processor 802 to execute a power-on self-test (POST). The instructions may further cause the processor 802 to load a boot loader or an operating system (OS) from a mass storage device. Firmware 872 additionally may provide an abstraction layer for the hardware, such as a consistent way for application programs and operating systems to interact with the keyboard, display, and other input/output devices. When power is first applied to information handling system 800, the system may begin a sequence of initialization procedures, such as a boot procedure or a secure boot procedure. During the initialization sequence, also referred to as a boot sequence, components of system 800 may be configured and enabled for operation and device drivers may be installed. Device drivers may provide an interface through which other components of the system 800 can communicate with a corresponding device. The firmware 872 may include a basic input-output system (BIOS) and/or include a unified extensible firmware interface (UEFI). Firmware 872 may also include one or more firmware modules of the information handling system. Additionally, configuration settings for the firmware 872 and firmware of the information handling system 800 may be stored in the NVRAM 870. NVRAM 870 may, for example, be a non-volatile firmware memory of the information handling system 800 and may store a firmware memory map namespace 800 of the information handling system. NVRAM 870 may further store one or more container-specific firmware memory map namespaces for one or more containers concurrently executed by the information handling system.

Information handling system 800 may include additional components and additional busses, not shown for clarity. For example, system 800 may include multiple processor cores (either within processor 802 or separately coupled to the chipset 806 or through the PCIe buses 808), audio devices (such as may be coupled to the chipset 806 through one of the PCIe busses 808), or the like. While a particular arrangement of bus technologies and interconnections is illustrated for the purpose of example, one of skill will appreciate that the techniques disclosed herein are applicable to other system architectures. System 800 may include multiple processors and/or redundant bus controllers. In some embodiments, one or more components may be integrated together in an integrated circuit (IC), which is circuitry built on a common substrate. For example, portions of chipset 806 can be integrated within processor 802. Additional components of information handling system 800 may include one or more storage devices that may store machine-executable code, one or more communications ports for communicating with external devices, and various input and output (I/O) devices, such as a keyboard, a mouse, and a video display.

In some embodiments, processor 802 may include multiple processors, such as multiple processing cores for parallel processing by the information handling system 800. For example, the information handling system 800 may include a server comprising multiple processors for parallel processing. In some embodiments, the information handling system 800 may support virtual machine (VM) operation, with multiple virtualized instances of one or more operating systems executed in parallel by the information handling system 800. For example, resources, such as processors or processing cores of the information handling system may be assigned to multiple containerized instances of one or more operating systems of the information handling system 800 executed in parallel. A container may, for example, be a virtual machine executed by the information handling system 800 for execution of an instance of an operating system by the information handling system 800. Thus, for example, multiple users may remotely connect to the information handling system 800, such as in a cloud computing configuration, to utilize resources of the information handling system 800, such as memory, processors, and other hardware, firmware, and software capabilities of the information handling system 800. Parallel execution of multiple containers by the information handling system 800 may allow the information handling system 800 to execute tasks for multiple users in parallel secure virtual environments.

The schematic flow chart diagrams of FIGS. 3, 4, 5, and 6 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Certain elements of embodiments described in this specification have been labeled as modules. A module may include a component of that information handling system suitably programmed to operate according to executable instructions. For example, a module may be implemented as a hardware circuit comprising custom VLSI circuits or gate arrays, semiconductor chips comprising logic circuitry, transistors, or other discrete components. A module may also be implemented in programmable hardware devices such as field programmable gate arrays, programmable array logic, programmable logic devices, a controller, or the like.

Modules may also include software-defined units or instructions that, when executed by a component of an information handling system, retrieve and transform data stored on a data storage device from a first state to a second state. An identified module of executable code may, for example, comprise one or more physical blocks of computer instructions which may be organized as an object, procedure, or function. The executables of an identified module need not be physically located together, but may comprise disparate instructions stored in different locations which, when joined logically together, comprise the module, and when executed by the processor, achieve the stated data transformation.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Further, a device or system that is configured in a certain way is configured in at least that way, but it can also be configured in other ways than those specifically described. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
   a frame configured to house a first input device for receiving user input; and
   a second input device comprising at least one sensor located on an outward facing surface of the frame, wherein the at least one sensor is configured to detect user input based on an infrared proximity sensor of the at least one sensor while the user is interacting with the first input device, wherein the infrared proximity sensor includes light pipes facing outward of the first input device toward a direction opposite to the first input device, wherein each light pipe is configured to transmit an on-off-keying frequency modulated light signal.

2. The apparatus of claim 1, further comprising piezoelectric actuators coupled to the frame configured to provide haptic feedback.

3. The apparatus of claim 1, wherein the at least one sensor comprises at least one of:
   a proximity mutual capacitance sensor comprising a pair of X-Y traces configured to provide a directive capacitance field;
   a touch mutual-capacitance sensor comprising a pair of X-Y traces configured to provide a directive capacitance field; or
   a self-capacitance sensor comprising a sensor electrode configured to measure a capacitance between the electrode and a ground of a touch sensor circuit.

4. The apparatus of claim 1, wherein the first input device comprises a plurality of keys arranged in a plurality of rows on a first surface of the frame, wherein the at least one sensor is located on a second surface of the frame adjacent to a spacebar key of the plurality of keys on the first surface.

5. The apparatus of claim 4, wherein the at least one sensor is located on the second surface approximately centered with regard to the first input device on the first surface.

6. The apparatus of claim 1, further comprising a controller coupled to the first input device and the at least one sensor, wherein the controller is configured to interface with an information handling system and transmit indications of user input received at the first input device and the at least one sensor through a single communications interface.

7. A method, comprising:
   receiving, by an information handling system while a user is interacting with a first input device, an indication that at least one sensor, located on an outward facing surface of a frame housing the first input device, is actuated based on an infrared proximity sensor of the at least one sensor, wherein the infrared proximity sensor includes light pipes facing outward of the first input device toward a direction opposite to the first input device, wherein each light pipe is configured to transmit an on-off-keying frequency modulated light signal;
   comparing, by the information handling system, the indication to an active profile configuration;
   identifying, by the information handling system, the indication as an input based on the active profile configuration; and
   executing, by the information handling system, an action based on the indication and the active profile configuration.

8. The method of claim 7, wherein executing the action comprises providing haptic feedback through piezoelectric actuators of the first input device.

9. The method of claim 7, wherein the at least one sensor comprises at least one of:
   a proximity mutual-capacitance sensor comprising a pair of X-Y traces configured to provide a directive capacitance field;
   a touch mutual-capacitance sensor comprising a pair of X-Y traces configured to provide a projected/directive capacitance field; or
   a self-capacitance sensor comprising a sensor electrode configured to measure a capacitance between the sensor electrode and a ground of a touch sensor circuit.

10. The method of claim 7, wherein the first input device comprises a plurality of keys arranged in a plurality of rows on a first surface of the frame, wherein the at least one sensor is located on a second surface of the frame adjacent to the first surface.

11. The method of claim 10, wherein the at least one sensor is located on the second surface approximately centered with regard to the first input device on the first surface.

12. The method of claim 7, further comprising:
   activating one of a plurality of profile configurations, wherein each profile configuration of the plurality of profile configurations maps input to the at least one sensor with an input to the first input device.

13. An information handling system, comprising:
   a memory; and
   an interface configured to couple to a user input device;
   a processor coupled to the memory and coupled to the interface and configured to perform steps comprising:
      receiving, through the interface and while a user is interacting with a first input device of the user input device, an indication that at least one sensor, located on an outward facing surface of a frame housing the first input device, is actuated, wherein the at least one sensor comprises an infrared proximity sensor including light pipes facing outward of the first input device toward a direction opposite to the first input device, wherein each of the light pipes of the infrared proximity sensor is configured to transmit an on-off-keying frequency modulated light signal;
      comparing the indication to an active profile configuration;

identifying the indication as an input based on the active profile configuration; and executing an action based on the indication and the active profile configuration.

14. The information handling system of claim 13, wherein executing the action comprises providing haptic feedback through piezoelectric actuators of the user input device by transmitting commands through the interface.

15. The information handling system of claim 13, wherein the first input device comprises a plurality of keys arranged in a plurality of rows on a first surface of the frame, wherein the at least one sensor is located on a second surface of the frame adjacent to the first surface.

16. The information handling system of claim 15, wherein the at least one sensor is located on the second surface approximately centered with regard to the first input device on the first surface, wherein the at least one sensor comprises two sensors, wherein when the two sensors are simultaneously actuated, the indication indicates a first sensor of the two sensors is actuated, and wherein the first sensor is closer to a center with regard to the first input device on the first surface than another sensor of the two sensors.

17. The information handling system of claim 13, further comprising a controller coupled to the first input device and the at least one sensor, wherein the controller is configured to interface with an information handling system and transmit indications of user input received at the first input device and the at least one sensor.

18. The information handling system of claim 13, wherein the processor is further configured to support a plurality of profile configurations, wherein each profile configuration of the plurality of profile configurations maps input to the at least one sensor with an input to the first input device.

19. The information handling system of claim 18, wherein the processor is further configured to switch from a first profile of the plurality of profile configurations to a second profile of the plurality of profile configurations when the processor detects a predefined user input to a combination of the first input device and the at least one sensor.

* * * * *